(12) United States Patent
Lau

(10) Patent No.: US 9,781,958 B2
(45) Date of Patent: Oct. 10, 2017

(54) BRAKE AND TURN SIGNAL GEAR

(71) Applicant: Koon Hang Lau, Hong Kong (HK)

(72) Inventor: Koon Hang Lau, Hong Kong (HK)

( * ) Notice: Subject to any disclaimer, the term of this patent is extended or adjusted under 35 U.S.C. 154(b) by 346 days.

(21) Appl. No.: 14/513,193

(22) Filed: Oct. 13, 2014

(65) Prior Publication Data
US 2015/0106996 A1 Apr. 23, 2015

Related U.S. Application Data

(60) Provisional application No. 61/892,478, filed on Oct. 18, 2013, provisional application No. 62/004,881, filed on May 29, 2014.

(51) Int. Cl.
| | |
|---|---|
| *B62J 3/00* | (2006.01) |
| *A41D 19/00* | (2006.01) |
| *B60Q 1/26* | (2006.01) |
| *B62J 6/16* | (2006.01) |
| *A41D 13/005* | (2006.01) |
| *B62J 6/00* | (2006.01) |

(Continued)

(52) U.S. Cl.
CPC ..... *A41D 19/0024* (2013.01); *A41D 13/0051* (2013.01); *B60Q 1/2673* (2013.01); *B62J 6/003* (2013.01); *B62J 6/005* (2013.01); *B62J 6/04* (2013.01); *B62J 6/16* (2013.01); *A41D 19/0157* (2013.01); *B60Q 2900/30* (2013.01); *B62J 2006/006* (2013.01); *B62J 2006/008* (2013.01)

(58) Field of Classification Search
CPC ............ A41D 19/0024; A41D 13/0051; A41D 19/0157; B62J 6/04; B62J 6/003; B62J 6/005; B62J 6/16; B62J 2006/006; B62J 2006/008; B60Q 1/2673; B60Q 2900/30
USPC ....... 340/432, 475, 479; 701/2, 70; 705/26.4
See application file for complete search history.

(56) References Cited

U.S. PATENT DOCUMENTS

| | | | |
|---|---|---|---|
| 9,423,498 B1 * | 8/2016 | Brown | ............... G08G 1/16 |
| 2008/0083721 A1 * | 4/2008 | Kaiserman | ........... A43B 3/0005 |
| | | | 219/211 |

(Continued)

FOREIGN PATENT DOCUMENTS

| | | |
|---|---|---|
| CN | 202525161 U | 11/2012 |
| CN | 203121096 U | 8/2013 |
| EP | 2626245 A1 | 8/2013 |

(Continued)

OTHER PUBLICATIONS

Extended European Search Report for EP Application No. 14189339.6.

*Primary Examiner* — Dhaval Patel
(74) *Attorney, Agent, or Firm* — Spruson & Ferguson (Hong Kong) Limited

(57) ABSTRACT

The present invention provides a signal gear for cyclist to give brake and turn signals to other road users while the cyclist has full control of the handle bar and brake. The signal gear of the present invention is preferably a glove with finger portions. Control and activation of the turn and/or brake signals is mainly by using electrical conductive nature of the signal glove as a switch of the signaling component which is either incorporated with the glove or with the vehicle (e.g. bicycle). The signaling component can emit turn/brake light signal or transmit an activation signal to a light emitting device to give turn/brake light signal. The turn and brake light signals are in yellow and red color, respectively.

18 Claims, 15 Drawing Sheets

(51) Int. Cl.
*B62J 6/04* (2006.01)
*A41D 19/015* (2006.01)

(56) References Cited

U.S. PATENT DOCUMENTS

2009/0140847 A1  6/2009  Yen et al.
2012/0096620 A1  4/2012  Baacke

FOREIGN PATENT DOCUMENTS

GB  420208  A  11/1934
GB  2412055  A  9/2005
GB  2471684  A  1/2011

* cited by examiner

Top View        Bottom View (A)

Going Forward (B)

Stopping / Slowing Down (C)

Turning Left (D)

Turning Right (A)

(B)

Going Forward

Stopping / Slowing Down

Turning Left

Turning Right

Going Forward

Stopping / Slowing Down

Turning Left

Turning Right

Going Forward

Stopping / Slowing Down

Turning Left

Turning Right

BRAKE AND TURN SIGNAL GEAR

CROSS REFERENCE TO RELATED APPLICATION

Pursuant to 35 U.S.C. §119(e), this is a non-provisional patent application which claims benefit from US provisional patent application Ser. No. 61/892,478 filed Oct. 18, 2013 and U.S. provisional patent application Ser. No. 62/004,881 filed May 29, 2014, and the disclosure of which are incorporated herein by reference in their entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates to a signal gear, in particular, to a brake and turn signal gear (BTG) for bicycle. The signal gear of the present invention is mainly used when cycling.

BACKGROUND OF THE INVENTION

Many jurisdictions require cyclists to install certain signal lights or equivalent signaling mechanism into their bicycle when using their bicycle in public area such as specific paths, streets or roads. These signal lights usually include turn and brake signals in order to notify other users on the paths, streets or roads the respective turning and stopping motions of the bicycle. However, most of the conventional gears for cyclists capable of giving these signals are either bulky, difficult to install, inefficient, inaccurate, or non-user friendly. For example, a signal light glove provided in Chinese utility model patent publication number CN203121096U was incorporated with at least one pressure sensor into its finger section for sensing the pressure between the finger of the cyclist and the handle bar of the bicycle and comparing with a predetermined threshold in order to execute the signal. However, the sensing mechanism depending on pressure sensor is easy to make wrong signals if the cyclists accidentally apply pressure through their finger where the pressure sensor is incorporated and the pressure value is over the predetermined threshold. It implies that such sensor may be useful for experienced cyclists who are aware of this sensing mechanism. Otherwise, normal cyclists may be at risks of giving wrong signals to the other users on the paths, streets or roads by using the signal glove provided in CN203121096U. In another Chinese utility model patent publication number CN202525161U, a turn signal glove was provided. An on/off button incorporated into the index finger section of this glove is used to control the power on/off of the glove, which is not user-friendly when a quick turn motion of the bicycle is required. The light signal is only limited to the diode on palm section of the glove and no signal transmitter is incorporated in this glove. In the UK patent application publication number GB420208A, an electrical wire-connected glove with a signal lamp was provided. The control mechanism is by manipulating position of thumb and a finger of the glove in order to establish the electric circuit of the signal lamp. However, the glove provided in this UK patent is bulky and non-user friendly because at least two fingers need to be in contact with each other in order to turn on the signal lamp. Normal cyclists may only have three fingers left on each hand to hold the bicycle handle bar when this signal lamp needs to be turned on. Contact of two fingers should also be accurate enough in order to establish the electric circuit of the signal lamp provided in this UK patent. In GB2412055A, the cycle indication glove fitted with front and back flashing indicating units was provided, where the indicating units are activated by means of contacting two switching contacts (i.e. button) fitted on forefinger and thumb. When two switching contacts are contacted with each other by the forefinger and thumb, the LEDs inside the indication units are activated to allow the cyclist be highly visible and recognizable while making hand signals. Again, the switching contacts fitted on two fingers of the glove should be in perfect contact in order to establish the electric circuit of the indication units. It also does not favor giving brake signal if the cyclist needs to stop the bicycle by holding the brake handle of the handle bar with the forefinger and thumb. In GB2471684, there is a pressure switch located on topside of the cyclist's finger, which can be operated by the cyclist to move the finger so that the switch presses against the side of brake level, thereby causing activation of the switch and leading to the light signal. Although the position of the pressure switch is designed to avoid accidental activation, the position to where the pressure is applied is limited to the underside of the brake. If the hand brake of the bicycle is not held in a position parallel to the handlebar, this activation mechanism of the light signal will not be applicable.

SUMMARY OF THE INVENTION

In order to provide a non-bulky, easy to install, efficient, accurate and user friendly signal gear for cyclists, the present invention provides a brake and turn signal gear (BTG) which can be worn by the cyclists and has at least one surface that is in contact with a corresponding surface of the bicycle such that the cyclists wearing the BTG can activate a signal, e.g. brake or turn signal, during their ride on the bicycle while they can still hold the handle bar without any interruption. There is provided an electrical conductive material attached to at least one surface of the gear for use as a switch of an electric circuit of the light signal. In a first embodiment, the gear is a glove with finger portions or fingerless. In this embodiment, the conductive material is attached to bottom side of two fingers, e.g. index finger and middle finger, or two locations near finger tips with reasonable separation. The corresponding surface of the bicycle, e.g. hand brake, is made of or covered by electrically conductive material as well while the handle bar is inert or electrically non-conductive. In a second embodiment, the bendable and electrically conductive material is attached to the index finger and thumb head portion. In this embodiment, when two fingers attached with the bendable and conductive material are in contact with each other, it activates a relay switch circuit to turn the light signal off, and vice versa. In a third embodiment, as in the first embodiment, the electrically conductive material is attached to bottom side of the index and middle fingers but the handle bar is conductive instead of the hand brake. In this embodiment, when the two fingers attached with the bendable electrically conductive material are in contact with the conductive material on the handle bar, the relay switch circuit turns the light signal off, and vice versa. In a fourth embodiment, the conductive material is attached to bottom side of one finger, e.g. index finger, which is further extended towards the base of the finger until reaching part of the thumb through thenar eminence. In this embodiment, both the handle bar and hand brake are covered by the electrically conductive material except there is an insulator between the handle bar and the hand brake. When the circuit of the signal is closed by contacting the index finger and the thumb with the hand brake and the handle bar, respectively, the circuit is closed and the light signal is activated. In a fifth embodiment, the two fingers attached with the bendable and electrically conductive material are in contact with the conductive hand brake and conductive handle bar, respectively, the circuit is closed and the light signal is activated. The signal activated by either the first, second, third, fourth or fifth embodiment is preferably the brake signal. To compensate the risk of "switch" failure, additional sensor such as Inertial Measurement Unit (IMU) or Global Positioning System (GPS) device can be installed as a backup system to sense the deceleration of the bicycle to activate the brake signal. The brake signal, according to commonly used road signal, is a red light signal but does not mean that it cannot be in other colors. In the case of signal glove, the signal glove can be for left hand, right hand or for both hands at the same time. It should be understood that the left and right signal gloves are basically identical in terms of functionalities, but the orientation is opposite to each other. But for specific application, the left and right signal gloves can be different in functionality. Normally, both of them can be equipped with the brake light function but each of them is responsible for either the left or right turn signal light, so right glove is responsible for the right turn signal light. Each glove contains a battery storage compartment. Electric heater can be installed on the glove to warm the cyclists' hands. Signal light could be displayed by one or more signal light devices. The signal light devices can be installed on the bicycle (e.g. at the rear end of the bicycle which is visible to other road users) or on any part of the cyclist's body including but not limited to elbow, waist and head which is connected to the BTG by wire/wireless communication means, or attached to a piece of cloth or in a form of light module. The main purpose is to avoid the signal light emitted from the BTG to be obstructed by the cyclists' body, so it is to make sure the other road users or vehicle drivers behind or around the cyclists able to see the light and/or receive the message of the cyclist's intention. Power supply to the circuit of the signal can be external or internal, e.g. being attached to any part of the bicycle or the signal gear, or embedded inside the bicycle frame. The power supply can be a DC supply (e.g. non-chargeable or rechargeable battery) or a power source generated by other means, e.g. an electrical generator turned by motion of the bicycle and the electrical energy is stored in an electrical capacitor. The on/off of the gear can be controlled by a capacitive sensor or temperature sensor or any sensor which sense the gear is being worn on the cyclist hand so that when the cyclist wear the gear on their hand, it automatically turns the gear on and vice versa. The signaling component, e.g. light bulb or LED, and the "switch", i.e. when two pieces of the bendable and electrically conductive material are in contact with each other, or the two pieces of the bendable and electrically conductive material are in contact with the corresponding conductive material on the handle bar and hand brake respectively, a circuit is closed in order to activate the signaling component directly or indirectly. The signaling component can be connected to a relay switch circuit with normally-opened (NO) or normally-closed (NC) contact which is controlled by the "switch" circuit. A controlled circuit can also be incorporated with the signaling component, which may include a signal receiver to receive an activation signal from the "switch" control circuit while the "switch" control circuit may include a corresponding signal transmitter for transmitting an activating signal to the signal receiver of the controlled circuit incorporated with the signaling component. In this case, no electric wire is required between the "switch" circuit and the signaling component circuit. The signal transmitter and receiver can be communicated wirelessly. To compensate the risk of wire or wireless communication failure, additional sensor such as Inertial Measurement Unit (IMU) or Global Positioning System (GPS) device can be installed on the signaling component circuit as a backup system to sense the deceleration of the bicycle to activate the brake signal.

Apart from the brake signal, the signal gear of the present invention also includes an additional device to control and activate a turn signal. In a sixth embodiment, an electronic button (e.g. one-touch or multi-touch) is installed into a turn signal device attached to the signal gear. To activate a turn signal (e.g. yellow light), the cyclist needs to rotate his/her left or right hand outward against the handle bar in order to press, and slide the button up, down, inwards or outwards. The button switches the turn signal light between on, flash or off modes, depending on the configuration. It should be noted that the turn signal light is not limited to yellow light but also includes other colors. The turn signal itself is also not limited to light but can be accompanied with other visual or sound effect such as buzzes. Power supply to the turn signal device can be a DC supply or a power source generated by other means. The turn signal device can be incorporated into both left and right hand gloves as a pair or into only one of the left and right hand gloves. The turn signal device can also be attached to any part of the bicycle which is preferably visible to other path/street/road users. In the case of being attached to the part of the bicycle rather than to the signal glove, a pair of "control" and "controlled" circuits for (1) generating and transmitting an activation signal, and for (2) receiving the activation signal and respond with emitting a light signal, respectively, is required, and a physical or wireless communication means is also required between the two circuits.

BRIEF DESCRIPTION OF THE DRAWINGS

Embodiments of the present invention are described in more detail hereinafter with reference to the drawings, in which.

DETAILED DESCRIPTION OF THE INVENTION

The present invention provides a type of bicycle gear which contains a function of visual communication to other users on specific paths, streets or roads by signal light on/off, or displaying a specific meaning by words or graphics or color. The signal light on/off or other visual signal can be controlled by (1) any type of conductive material which contact and separate from each other to respectively close and open an electric circuit; or (2) any type of electronic/electric circuit in which the on/off or specific meaning/wording is controlled by buttons, external mechanical movement, dynamic pressure, sound wave, temperature, static air pressure, air humidity, speed, acceleration, deceleration, gravity change, light intensity, color temperature, radio signal, or any type of sensor.

One of the main objectives of the present invention is for the cyclists to communicate with the other path/street/road users about their intention (going forward, slowing, turning left, turning right). The operation is based on the conductive characteristic of the bicycle brake handle to contact with a bendable (flexible, elastic) and electrical conductive material that is attached to part of the bicycle gear of the present invention which the cyclist is in control during cycling, preferably a cloth or garment product, e.g. cycling glove. The signal light can be installed on any type of garment or clothing that is wearable by the cyclist, or attached on any part of the bicycle.

The present invention can be used as professional equipments such as those for policeman, fireman, rescuers, soldiers, divers, drivers, construction workers, or any person who would like to provide an instant visual communication with the others, from the surface area of their body or from an article that they are in use during emergency.

The following description and the corresponding embodiments of the present invention are set forth as preferred examples. It will be apparent to those skilled in the art that modifications, including additions and/or substitutions, may be made without departing from the scope and spirit of the invention. Specific details may be omitted so as not to obscure the invention; however, the disclosure is written to enable one skilled in the art to practice the teachings herein without undue experimentation.

EXAMPLES

Structure and Function of Brake and Turn Signal Gear (BTG)

Figure 1:
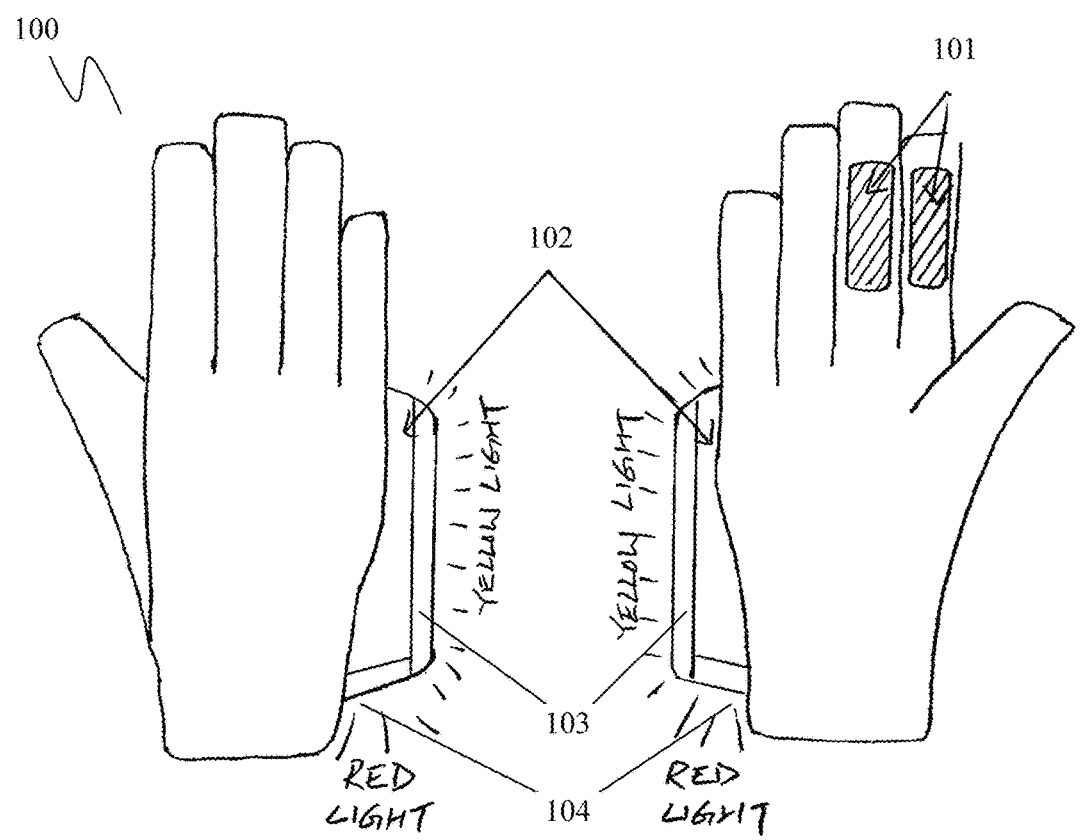
FIG. 1 illustrates top and bottom views of a brake and turn signal glove according to first embodiment of the present patent application.
Figure 3:
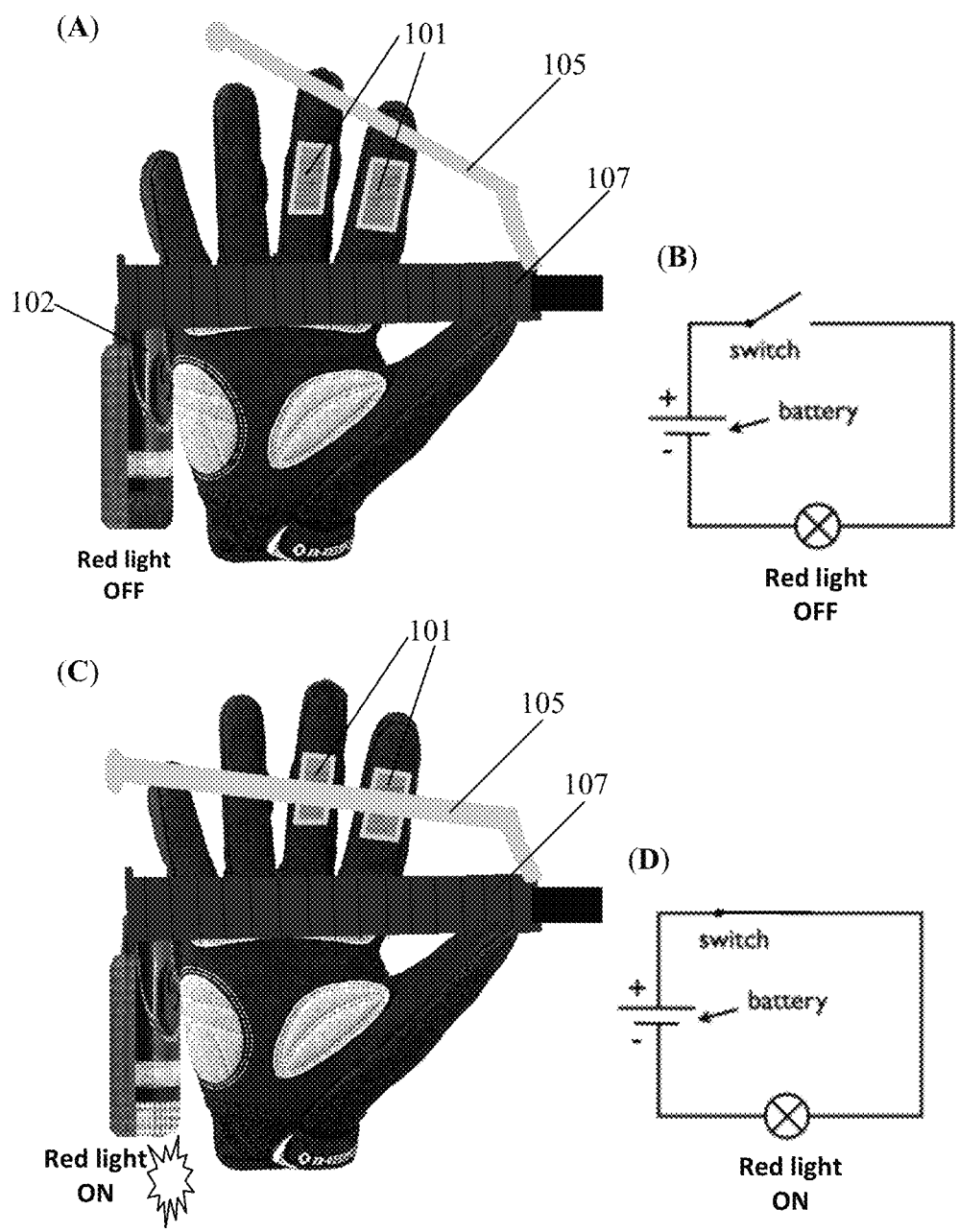
FIG. 3 illustrates how the brake light signal is turned on or off by contacting conductive glove fingers with the conductive hand brake according to the first embodiment of the present invention.

The present invention provides a signaling system which is a combination of bicycle gear of which the cyclist is in control during cycling, e.g. gloves, one or more brake light(s) and turn signal light(s). In an exemplary embodiment, the bicycle gear having brake and turn signaling function is a glove. The brake and turn signal gear 100 (or abbreviated as "BTG") configured as a glove includes any cloth or garment product covering partly or fully of the cyclist's hand (FIG. 1). It also includes a power supply compartment 102 which is a DC supply including non-chargeable or rechargeable battery. Alternatively, the DC supply can be replaced by an electrical generator capable of transforming other types of energy into electrical energy and storing the same therein, e.g. solar panel with capacitor. The power supply is mainly used to supply energy to a signaling component incorporated with the BTG. In this embodiment, the bendable and electrical conductive material 101 is attached to the bottom side of the index and middle fingers on the BTG. The position where the electrical conductive material 101 is attached corresponds to where the conductive material covers onto the hand brake (as illustrated in FIG. 3). The signaling component in this embodiment includes a turn signal 103 and a brake signal 104. The turn signal 103 is a yellow light while the brake signal 104 is a red light, and both of them are commonly used colors for turning and stopping motions of vehicles used on the roads. It should be understood that other visual or sound effects can be used for the brake and turn signals.

Figure 2:
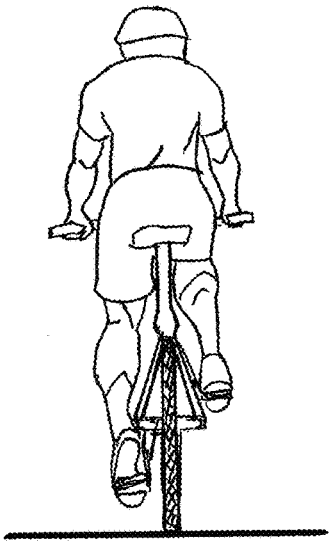
FIG. 2 illustrates the visual effect of different light signals activated by the BTG of the present invention to indicate turning and/or stopping motion(s) of the bicycle.
Figure 2:
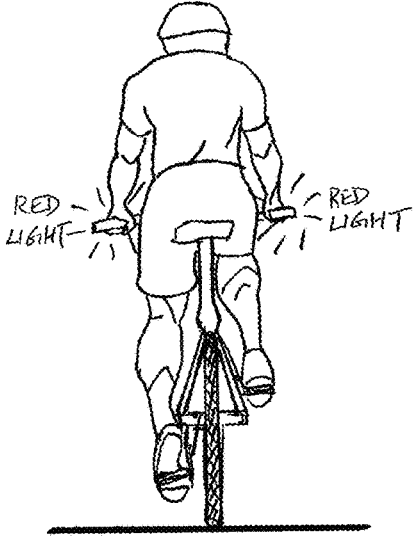
Figure 2:
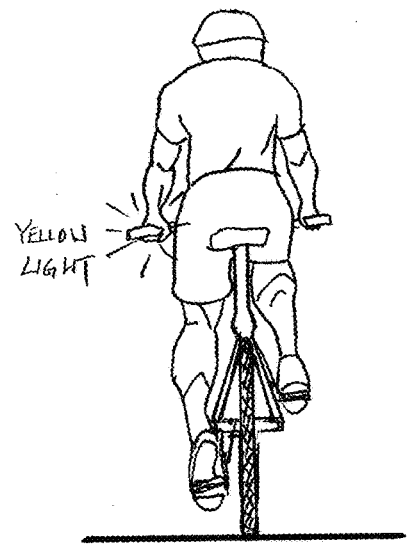
Figure 2:
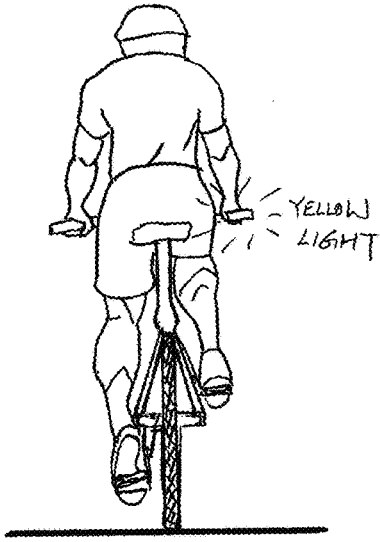
Figure 10:
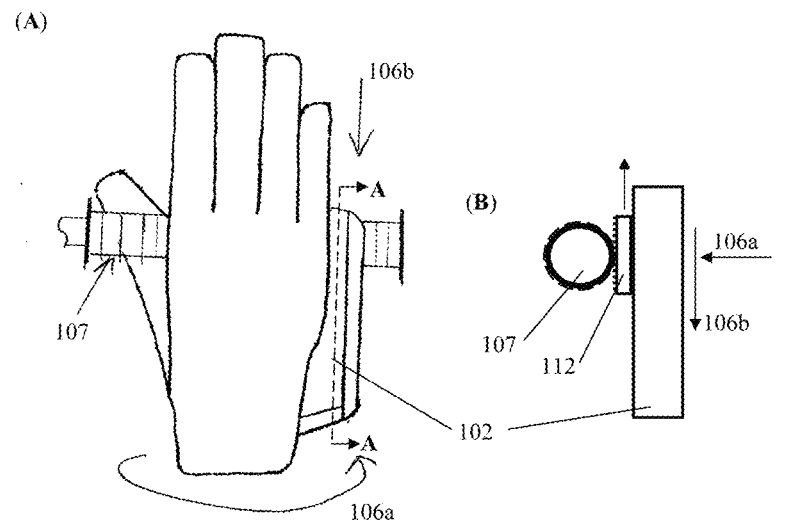
FIG. 10 illustrates the top (A), cross-sectional (B) and bottom (C) views of the turn signaling component of the present signal gear.
Figure 10:
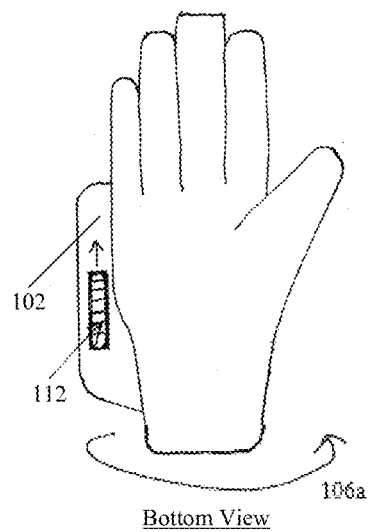

FIG. 2 illustrates an example when the BTG is in use by the cyclist. It is a series of schematic diagrams from the back view of the bicycle. FIG. 2A illustrates a situation where the bicycle is going forward. FIG. 2B illustrates a situation where a moving bicycle is intended to be stopped or slowed down with the red light activated on the BTG. The red light signal representing the brake signal is given by the corresponding signaling component 104 illustrated in FIG. 1. FIG. 2C illustrates a situation where a moving bicycle is intended to be turned to the left direction, and thereby activating the left turn signal light which is a yellow light signal. An example of the turn signal activation mechanism is further illustrated in FIG. 10. FIG. 2D illustrates an almost identical situation to that illustrated in FIG. 2C but in an opposite direction (i.e. right direction) controlled and activated by the BTG worn on right hand of the cyclist.

Example 1

In FIG. 3A, the brake signal is off because the "switch" is opened by virtue of two points of electrical conductive material on two separate fingers of the BTG which are not in contact with the corresponding conductive material on the hand brake. The open circuit for the situation in FIG. 3A is illustrated in FIG. 3B. When the two points of electrical conductive material on two separate fingers of the BTG are in contact with the corresponding conductive material on the hand brake, as shown in FIG. 3C, the circuit of the brake signal which is a red light signal is closed, as shown in the schematic diagram of FIG. 3D. In this situation, the red light is on to notify other road users that the bicycle is intended to either stop or slow down. Although the two points of electrical conductive material are attached onto the index and middle fingers respectively in this example, it should be understood that the conductive material is not limited to be attached to these two fingers. The electrical conductive material serving as a "switch" of a circuit can be attached on any two points on the surface of the BTG, provided that once the conductive material is in contact with the corresponding conductive material on the hand brake, a closed circuit can be established. Users can turn on the brake light either by their left or right glove; or they can touch both hands on the hand brake to turn on both of the brake lights in order to alert the other road users from either side behind them. In the case of non-conductive brake handle, conductive tape, conductive paint or any possible method can be applied to the designated area to provide conductivity.

Example 2

Figure 4:
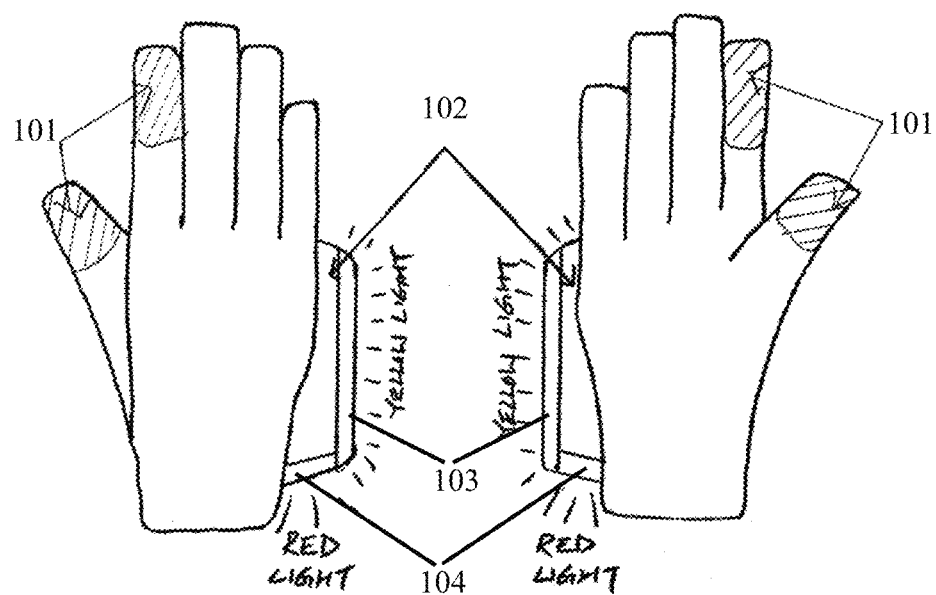
FIG. 4 illustrates top and bottom views of a brake and turn signal glove according to the second embodiment of the present invention.
Figure 5:
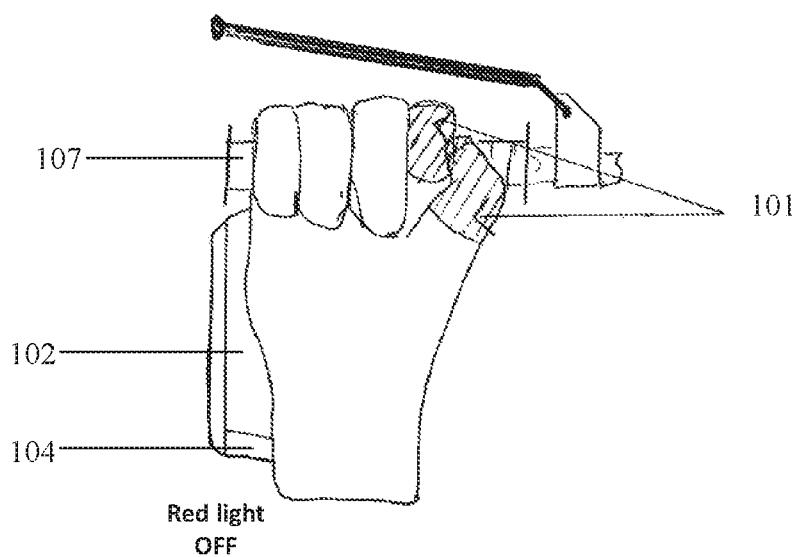
FIG. 5 illustrates how the brake light signal is turned on or off by contacting or separating the conductive glove fingers according to the second embodiment of the present invention.
Figure 5:
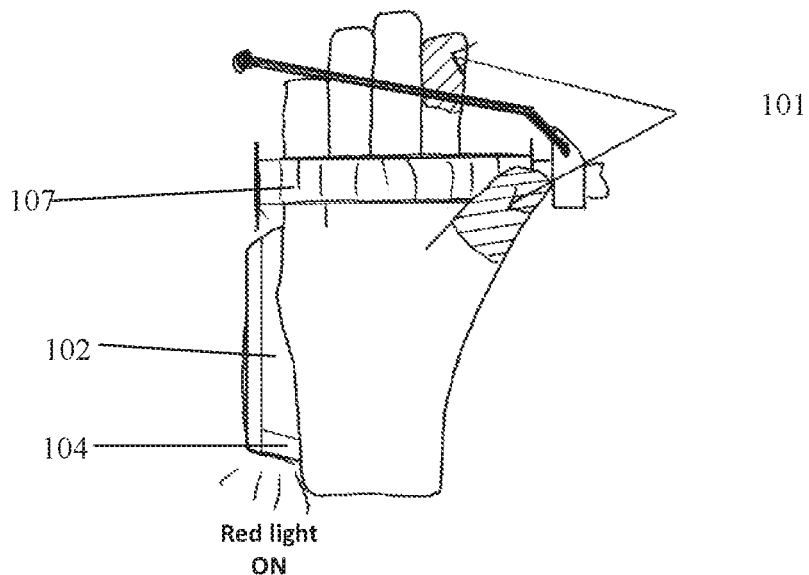

In FIG. 4, the conductive material covers the thumb and index finger of the BTG. The signaling component of the BTG also includes a turn signal (103) and brake signal (104). In this example, when the conductive material on the index finger is in contact with the conductive material on the thumb, the brake signal is off (FIG. 5A). On the other hand, when they are not in contact, brake signal is on (FIG. 5B). A relay switch circuit with normally-closed (NC) contacts is incorporated into the BTG. The relay switch circuit controls the on/off of the signal component, so that when the "switch" circuit is closed, the signal component is off. When the "switch" circuit is opened, the signal component is on. In this example, when the cyclist holds the handle bar 107 with his/her index finger touching the thumb, the conductive material 101 on those fingers will be in contact, the brake light 104 will be turned off (FIG. 5A). When the cyclist prepares to slow down or brake, he/she can release both fingers from each other. In that case, there is no contact between the conductive material 101 on the index finger and thumb, and as such the brake light 104 is turned on (FIG. 5B). Users in this example can turn on the brake light either by their left or right glove, or they can separate the index finger and thumb to turn on both of the brake lights in order to alert the other road users from either side behind them. The BTG of this example is also suitable for users who are driving a vehicle apart from bicycle, for example, the rollerblade player and scooter rider.

Example 3

Figure 6:
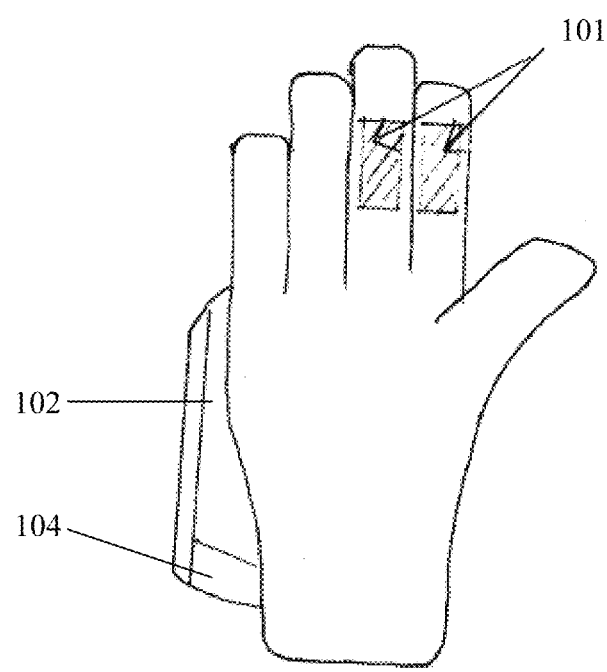
FIG. 6 illustrates bottom view of a brake and turn signal glove according to the third embodiment of the present invention.
Figure 7:
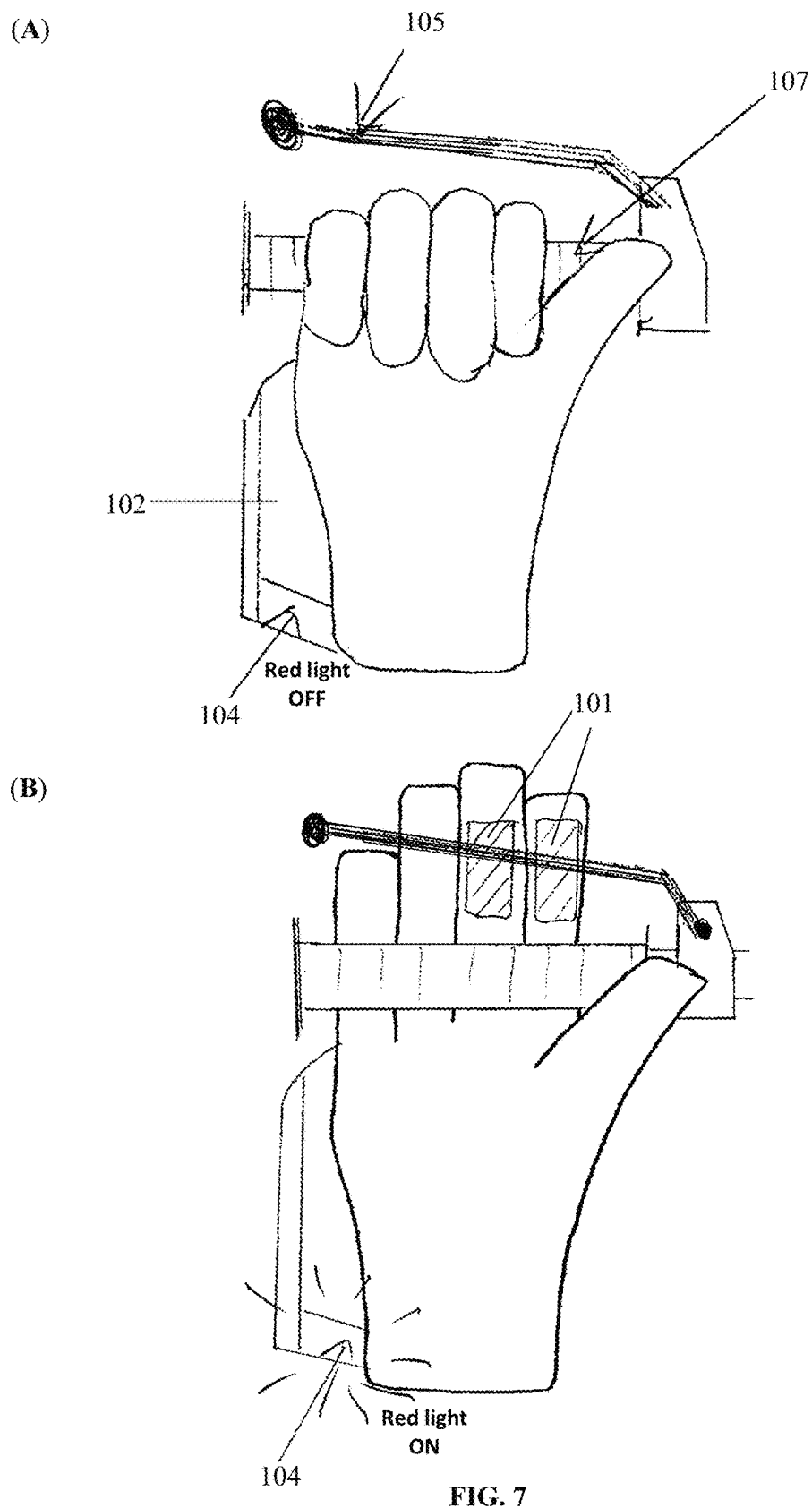
FIG. 7 illustrates how the brake light signal is turned on or off by contacting the conductive glove fingers with the conductive handle bar according to the third embodiment of the present invention.

FIG. 6 illustrates that the brake light 104 is operated by two pieces of conductive material 101 that are attached to bottom side of both index and middle finger. When the cyclist holds the conductive handle bar 107 with both index and middle fingers, the brake light 104 is turned off (FIG. 7A). It is controlled by the relay switch circuit with normally-closed (NC) contacts inside the battery compartment 102. When the cyclist prepares to slow down or to brake, he/she may release their fingers from the conductive handle bar 107, or then further holding the non-conductive hand brake with their fingers. In these situations, the conductive material between the index finger and middle finger are not in contact, and as such the brake light 104 is turned on (FIG. 7B).

Example 4

Figure 8:
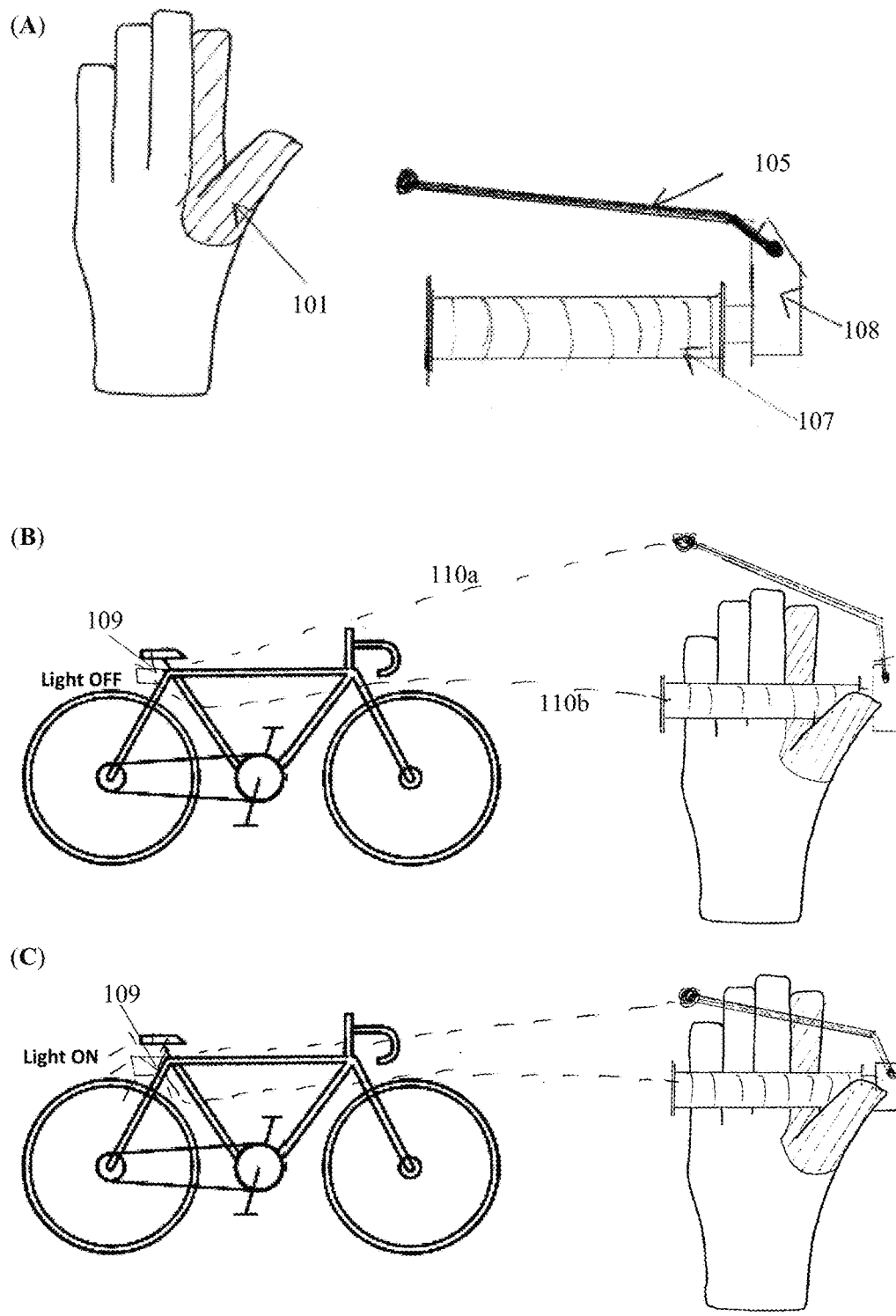
FIG. 8 illustrates the bottom view of a brake and turn signal glove according to the fourth embodiment of the present invention.

A separated brake light module with battery 109 is provided in this example, where one polarity 110a is connected to the conductive hand brake 105 and another polarity 110b is connected to the conductive handle bar 107 (FIG. 8A). Insulator 108 is installed between the conductive hand brake 105 and conductive handle bar 107. When the conductive material 101 attached on bottom side of the index finger and further extended to the thumb as one piece is not in contact with both the hand brake and the conductive handle bar, the electric circuit of the light module 109 is opened and the brake light is off (FIG. 8B). On the other hand, when the one piece of conductive material 101 is in contact with the conductive hand brake 105 and the conductive handle bar 107, the circuit of the light module 109 is closed and the brake light is thereby turned on (FIG. 8C). The brake light can be mounted on any part or at the back of the bicycle where other users are capable to visualize.

Example 5

Figure 9:
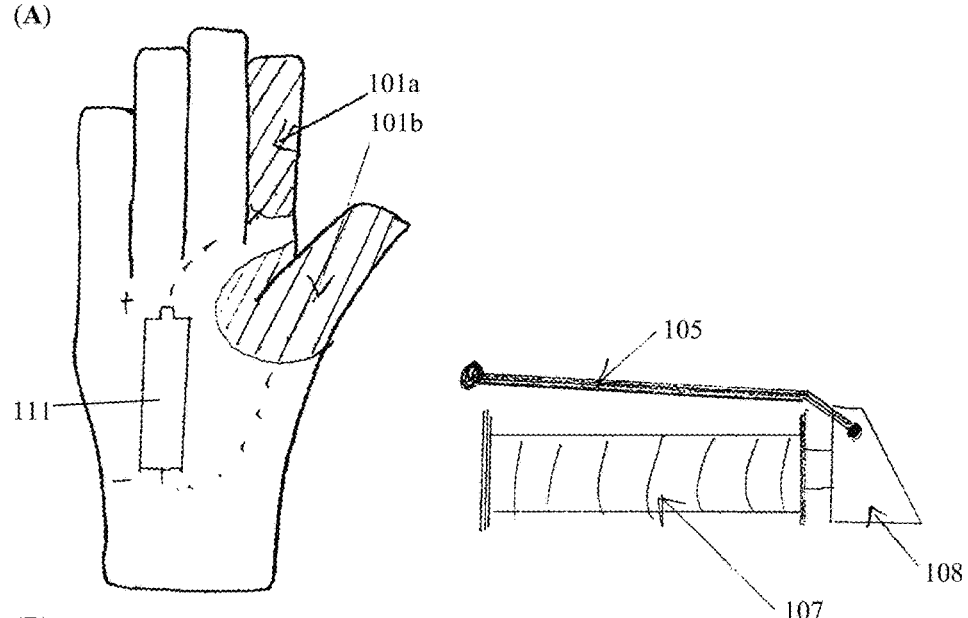
FIG. 9 illustrates the bottom view of a brake and turn signal glove according to the fifth embodiment of the present invention.
Figure 9:
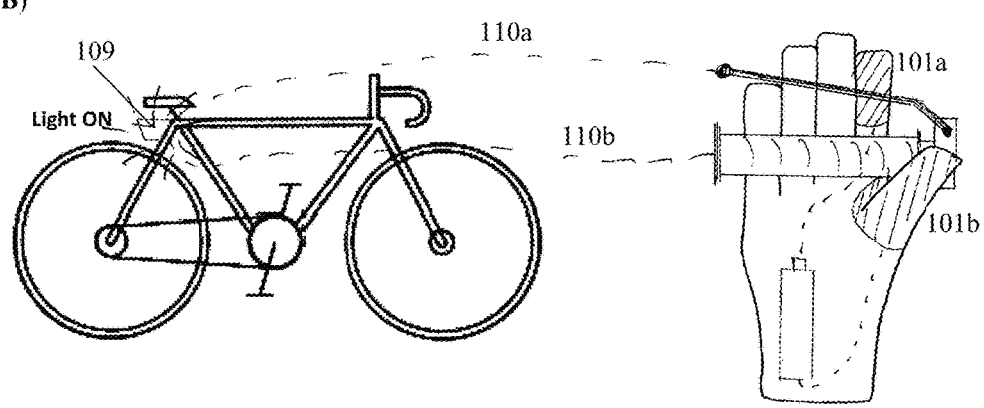

A separated brake light module with no battery 109 is provided, while the glove with battery 111 is used to power up the brake light of the light module 109 (FIG. 9). One polarity 110a of the brake light module is connected to the hand brake 105 and another polarity 110b is connected to the conductive handle bar 107 (FIG. 9A). When the positively charged conductive material (101a) attached on one finger (e.g. index finger) contacts with the conductive hand brake 105, and when the negatively charged conductive material (101b) attached on another finger (e.g. thumb) contacts with the conductive handle bar 107, the circuit of the light module 109 is closed and the power is supplied from the battery incorporated into the glove (FIG. 9B). In this example, the brake light can also be mounted on any part of the bicycle (e.g. at the seat post) where other users are capable to visualize. To prevent short circuit when two pieces of positively and negatively charged conductive material (101a, 101b) contact with each other, electric circuit incorporated in the glove is configured to prevent high current flowing through, e.g. a fuse or auto-disconnect switch, with a designated Amp value is incorporated into the circuit.

Example 6

FIG. 10A is a top view of the BTG which is incorporated with a button 112 located next to a finger, or any suitable position of the glove capable for the cyclist to press the button towards the handle bar. In order to use this button to control and activate the turn light signal, the cyclist first needs to rotate his/her hand (106a) against the handle bar 107, followed by pressing, or sliding the button upwards (106b), downwards, outward or inward so as to switch on the power supply for turn light signal. It should be noted that the turn signal light can be controlled by both hands or by one hand only. When it is controlled by one hand, i.e., one glove is in use, the glove in use acts as a master to transmit signal to another signal component circuit or glove, and that it receives signal and translate it into a designated signal.

FIGS. 10B and 10C are cross-sectional view and bottom view of the BTG corresponding to the top view of the BTG in FIG. 10A.

Example 7

Figure 11:
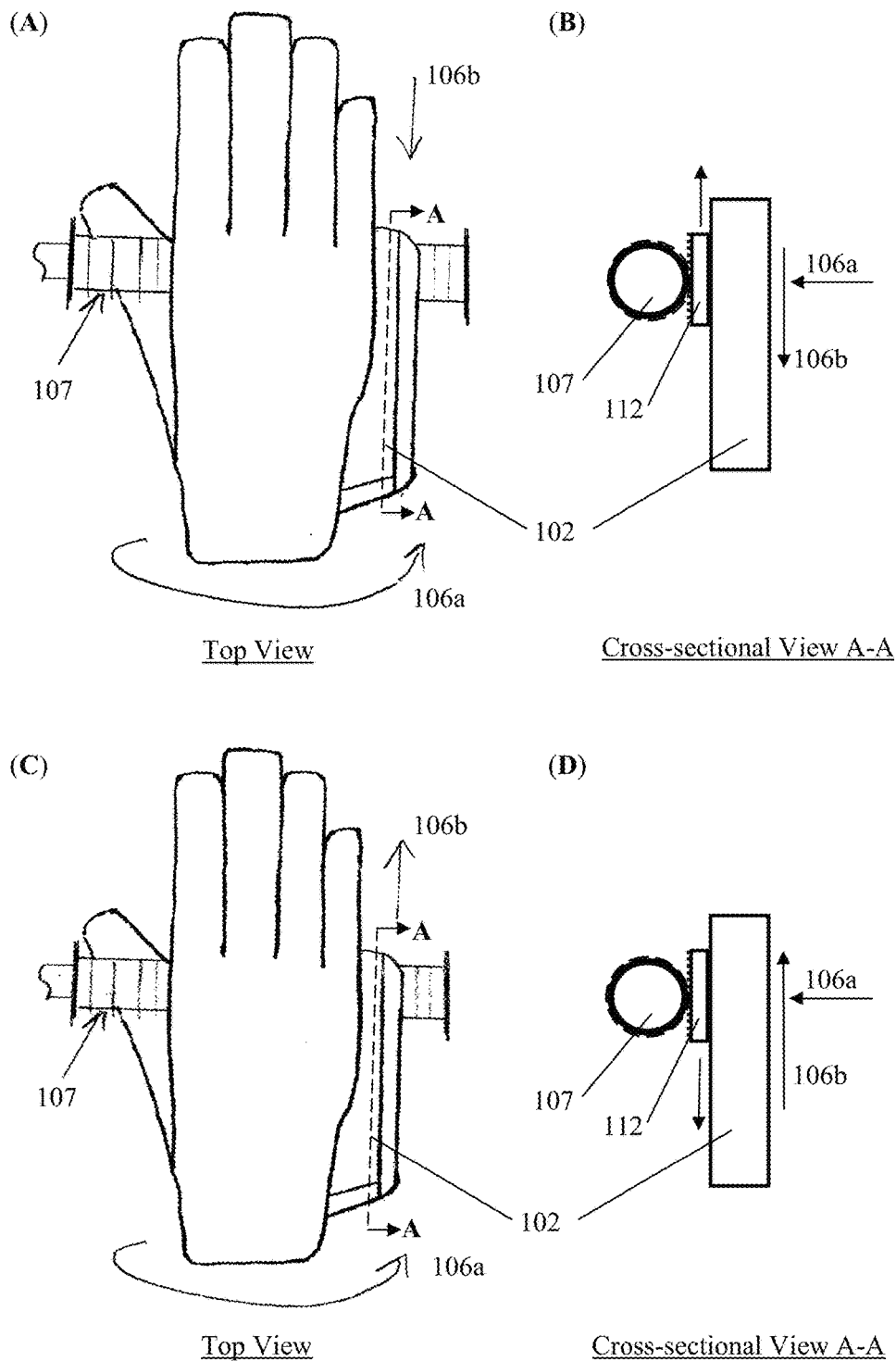
FIG. 11 illustrates the top and cross-sectional views of the turn signaling component of the present signal gear according to the sixth embodiment of the present invention.

FIG. 11 illustrates an example of controlling both left and right turn signals on one hand by using the button 112 which is located next to the right little finger. To activate the light (on, flash or off), cyclist needs to rotate his/her right hand outwards to press the button 112 towards the handle bar (FIG. 11A), then slide the button up against the elastic material on the handle bar to activate right turn signal (FIG. 11B). When cyclist rotates his/her right hand outwards to press the button 112 (FIG. 11C), then slide the button 112 down against the handle bar, left turn signal is activated (FIG. 11D).

Example 8

Figure 12:
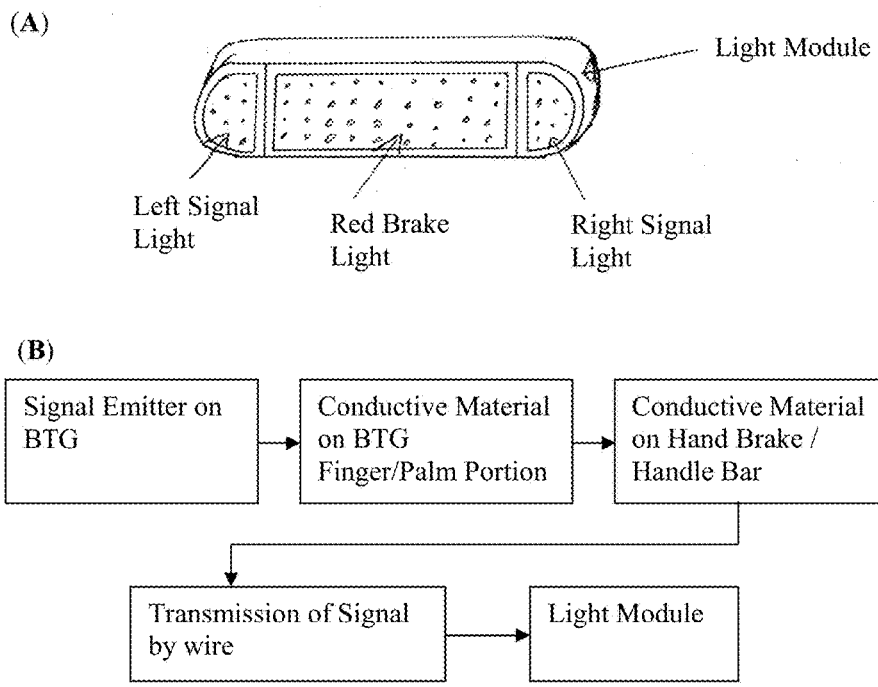
FIG. 12 illustrates a light module and its wired connection block diagram according to an embodiment of the present invention.
Figure 13:
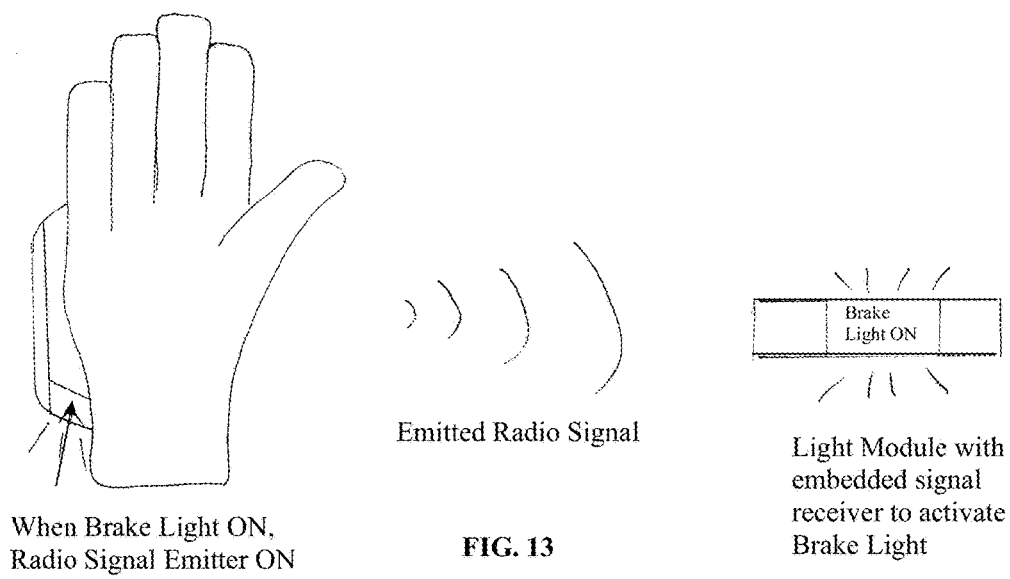
FIG. 13 illustrates a light module and its wireless connection according to an embodiment of the present invention.
Figure 14:
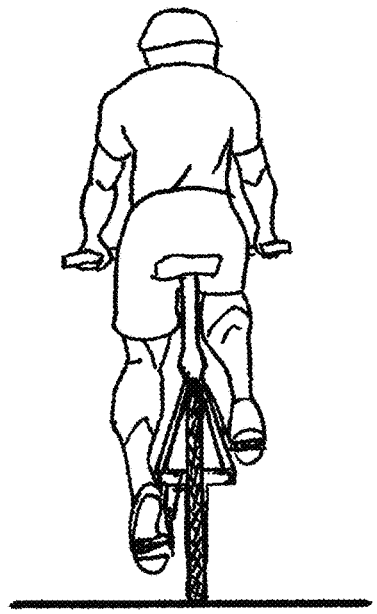
FIG. 14 illustrates the visual effect of different light signals from a light module activated by the BTG of the present invention to indicate turning and/or stopping motion(s) of the bicycle.
Figure 14:
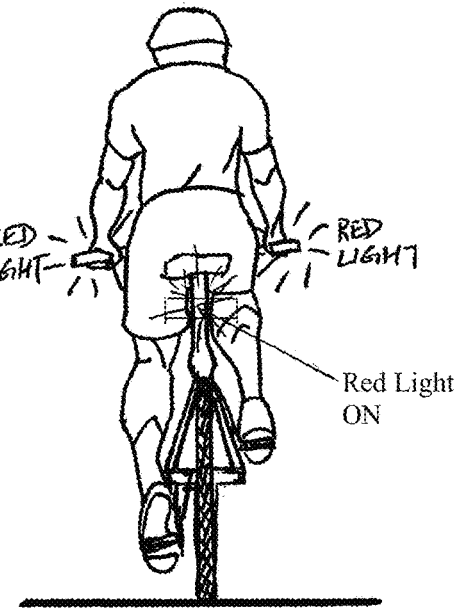
Figure 14:
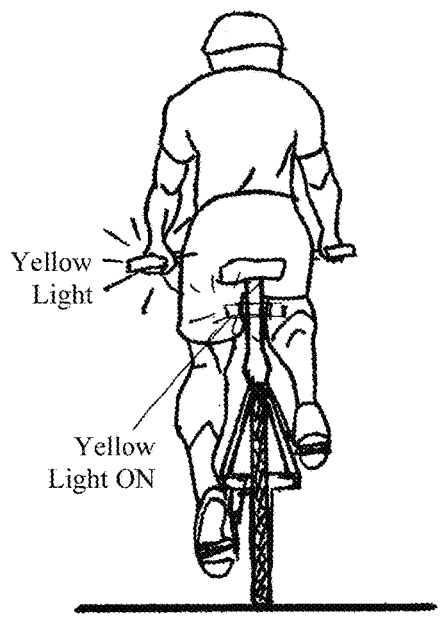
Figure 14:
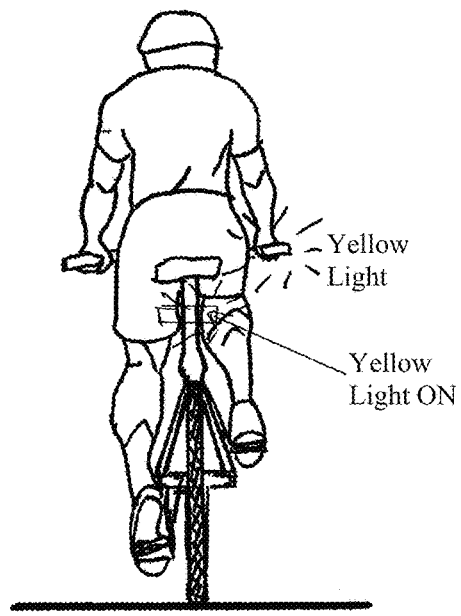
Figure 15:
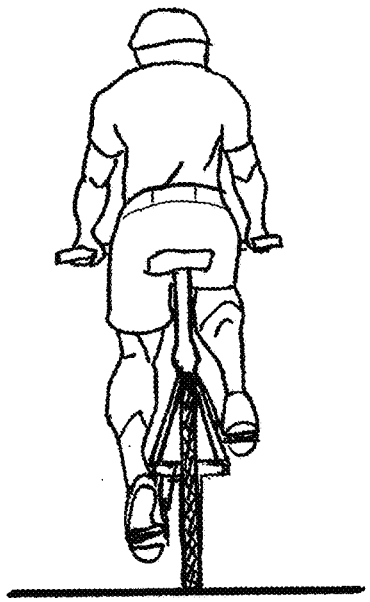
FIG. 15 illustrates the visual effect of different light signals from a waistband activated by the BTG of the present invention to indicate turning and/or stopping motion(s) of the bicycle.
Figure 15:
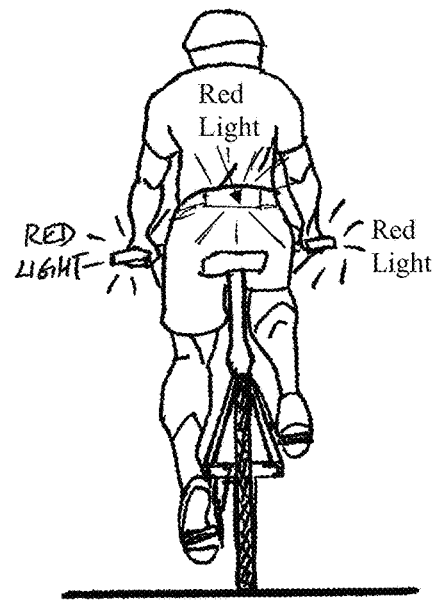
Figure 15:
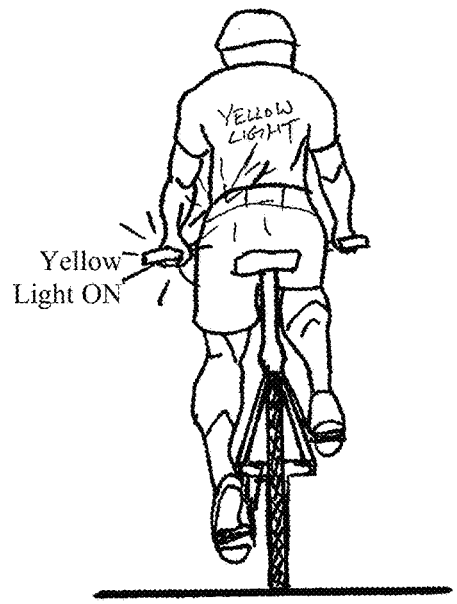
Figure 15:
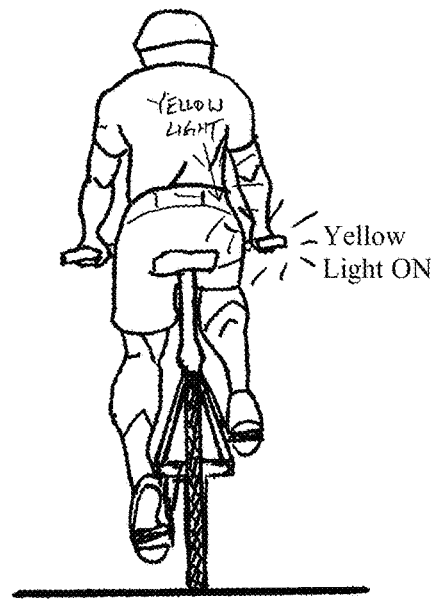
Figure 16:
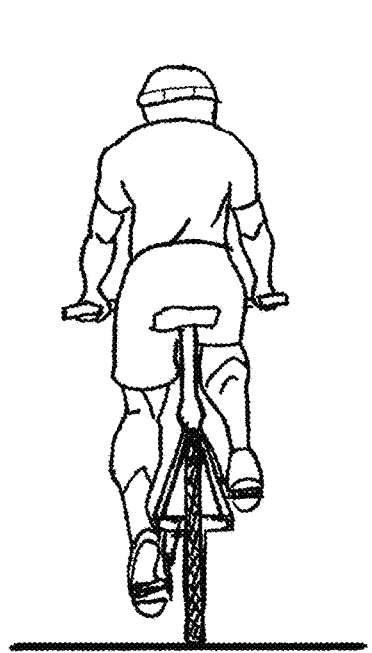
FIG. 16 illustrates the visual effect of different light signals from a headband or helmet activated by the BTG of the present invention to indicate turning and/or stopping motion(s) of the bicycle.
Figure 16:
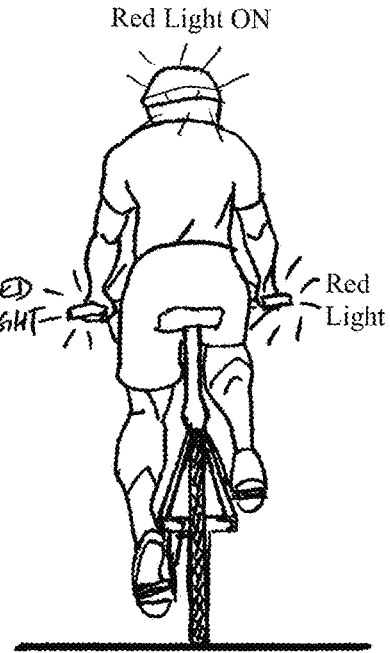
Figure 16:
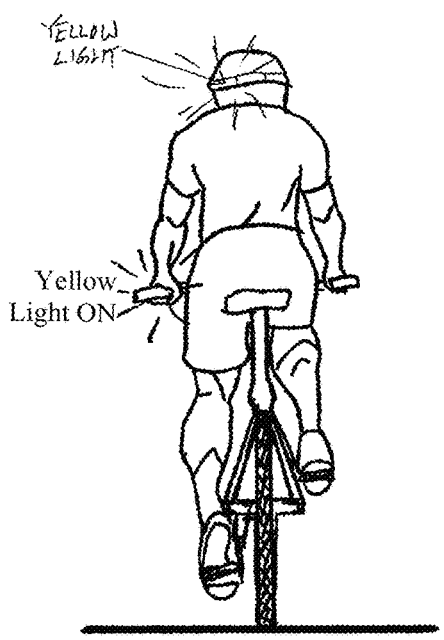
Figure 16:
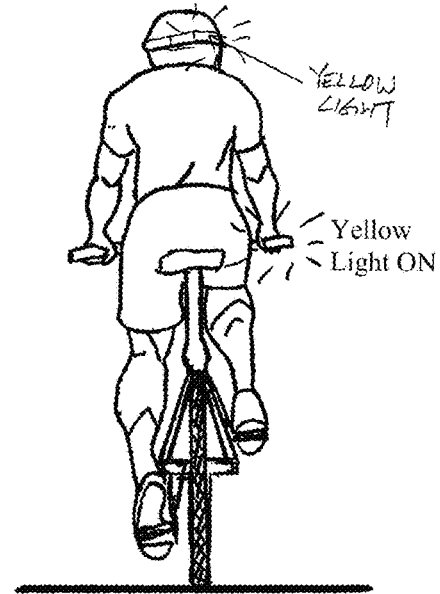

FIG. 12A illustrates an example of a light module, which is a combination of different light signals in a system that can be installed or attached on a part of the bicycle. It is a separate component from the BTG of the present invention but they are connected with electric wire or communicated wirelessly through a pair of signal transmitter and receiver. The flow chart in FIG. 12B illustrates how a physical wire (e.g. electric wire) is used to provide physical communication between the BTG to the light module. This physical communication configuration is more suitable for the cyclists who own a bicycle, so that the electric wire and/or the light module can be permanently installed into/on the bicycle, and ready for use once the cyclist wears the BTG incorporated with the signal transmitter. In the case of wireless communication between the BTG and the light module, it is achieved by installing a radio signal transmitter into the BTG and a corresponding signal receiver into the light module (FIG. 13). Each of the BTG and light module could be powered by separate power sources (e.g. separate battery compartments). When the brake light or turn signal light on the BTG is activated, or a circuit of a control signal transmitter is closed, the control signal transmitter will be activated to transmit an activation signal. When the light module receives the activation signal, it will translate such signal into an electric current in order to further activate the corresponding signal light of the light module. The visual effect of the corresponding signal light from the light module is thereby synchronized with that from the BTG, so that the intention of the cyclist will be visible to other users behind or sideway of the cyclist. In case of using a wireless communication between the BTG and the light module, the activation signal can be transmitted by Infra Red, Radio Frequency, or Blue Tooth, or any other wireless communication protocol/method from the BTG directly to the light module (FIG. 13). This non-physical communication configuration allows the combination of the BTG and light module be used in any types of bicycle, including those for rental or temporary use. An instantly detachable clip/lock can be designed for instant installation and removal of the light module onto part of the bicycle, e.g. seat post (FIG. 14). Other possible attachment position for this light module includes but not limited to back of belt (FIG. 15), elbow pad, slave glove, helmet (FIG. 16), backpack, jacket, T-shirt, etc. The light module installed or attached to different part(s) of the bicycle and/or cyclist or cyclist's items may vary in shape, size and format. The light module can be in a form of waistband and headband.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments are chosen and described in order to best explain the principles of the invention and its practical application, thereby enabling others skilled in the art to understand the invention for various embodiments and with various modifications that are suited to the particular use contemplated. It is intended that the scope of the invention be defined by the appended claims and their equivalence.

What is claimed is:

1. A brake and turn signal gear comprising a glove with finger portions wearable on at least one hand of a user, said glove comprising:
    two pieces of bendable and electrical conductive material attached to a bottom side of two of the finger portions of the glove for contacting a corresponding conductive part of a vehicle, and
    a signaling component comprising a brake signaling component and a turn signaling component,
    wherein the conductive part of the vehicle is a hand brake, a handle bar or both; the conductive part of the vehicle is covered by or made of electrical conductive material; said contact between the bendable and electrical conductive material attached to the glove and the corresponding conductive part of the vehicle opens or closes an electric circuit of the signaling component directly or indirectly, such that while both hands of the user hold the handle bar to fully control the vehicle, the user is capable of controlling both on/off of the brake signaling component and on/off of the turn signaling component.

2. The gear of claim 1, wherein said glove is attached with one piece of the bendable and electrical conductive material on the bottom side of index finger portion which is extended towards thumb portion of the glove for contacting the corresponding part of the vehicle, and wherein the conductive part of the vehicle is either a hand brake or a handle bar which is either covered by or made of electrically conductive material, and wherein said contacting of the conductive material attached on the glove with the conductive part of the vehicle either opens or closes a circuit of the brake signaling component, and wherein said conductive handle bar and conductive hand brake are separated by an insulator.

3. The gear of claim 1, wherein said two pieces of the bendable and conductive material are attached to the bottom side of index and middle finger portions of the glove separately for contacting the conductive hand brake of the vehicle such that when they are in contact the circuit of the brake signaling component is closed in order to activate the brake signal.

4. The gear of claim 1, wherein said two pieces of the bendable and conductive material are attached to part or whole index finger head portion and thumb head portion of the glove separately for holding the non-conductive handle bar of the vehicle such that when they are in contact, the circuit of the brake signaling component is opened; while the circuit is closed when the conductive material on index finger head portion and thumb head portion of the glove are separated and not in contact once those fingers release from the handle bar and apply brake by holding the hand brake in order to activate the brake signal.

5. The gear of claim 1, wherein said two pieces of the bendable and conductive material are attached to the bottom side of index and middle finger portions of the glove separately for contacting the conductive handle bar of the vehicle such that when they are in contact, the circuit of the brake signaling component is opened; while the circuit is closed when the index and middle finger portions of the glove release from the conductive handle bar in order to activate the brake signal.

6. The gear of claim 1, wherein said two pieces of the bendable and conductive material are attached to the bottom side of index finger and thumb portions of the glove separately for contacting the conductive handle bar and conductive hand brake of the vehicle such that when two fingers are in contact with the conductive handle bar and conductive hand brake respectively, the circuit of the brake signaling component is closed such that the brake signal is activated, and wherein said conductive handle bar and conductive hand brake are separated by an insulator.

7. The gear of claim 1, wherein said brake signaling component comprises a backup system to activate the brake signal by Inertial Measurement Unit (IMU) or Global Positioning System (GPS) device.

8. The gear of claim 1, wherein said brake signaling component comprises a light emitting device which is either incorporated with the gear or physically separated from the gear.

9. The gear of claim 1, wherein said gear comprises a power source for supplying power to the brake signaling component in order to emit light signal when the circuit of the brake signaling component is closed.

10. The gear of claim 1, wherein said gear comprises a power source for supplying power to an electric heater on the glove to warm the cyclist's hand.

11. The gear of claim 1, wherein said gear comprises a capacitive sensor or temperature sensor or any other sensor which senses the gear is being worn on the cyclist's hand to control the on/off of the gear.

12. The gear of claim 8, wherein said light emitting device physically separated from the gear is either installed on at least one part of the vehicle or wearable on at least one part of the user's body other than hands.

13. The gear of claim 12, wherein said light emitting device physically separated from the gear is either connected with the brake signaling component through electric wires or communicated with the brake signaling component wirelessly through radio frequency, bluetooth, or other wireless communication means, and wherein the light emitting device communicated with the brake signaling component wirelessly comprises a signal receiver for receiving an activation signal from a corresponding signal transmitter incorporated into the brake signaling component, said activation signal activates the light emitting device to emit light signal.

14. The gear of claim 12, wherein said light emitting device physically separated from the gear comprises a backup system to activate the brake signal by Inertial Measurement Unit (IMU) or Global Positioning System (GPS) device.

15. The gear of claim 1, wherein said gear further comprises a power source for the turn signaling component, and a button which is capable of controlling on, off, or flash mode of the turn signaling component by moving the user's hand while the user is holding the handle bar of the vehicle, and said button is activated by the movement of the user's hand by either pressing, rotating or moving in different direction against the handle bar.

16. The gear of claim 1, wherein said turn signaling component emits yellow light when being activated and said brake signaling component emits red light when being activated in order to notify other users in public area the user's intentions to turn left/right and stop/slow down the vehicle, respectively.

17. The gear of claim 1, wherein the vehicle is a bicycle.

18. The gear of claim 1, wherein the glove is either a left or right glove and configurations of the left and right gloves are identical or different from one another.

* * * * *